June 24, 1930.  A. L. SHAW  1,765,945
CONVEYER CHAIN
Filed July 9, 1928
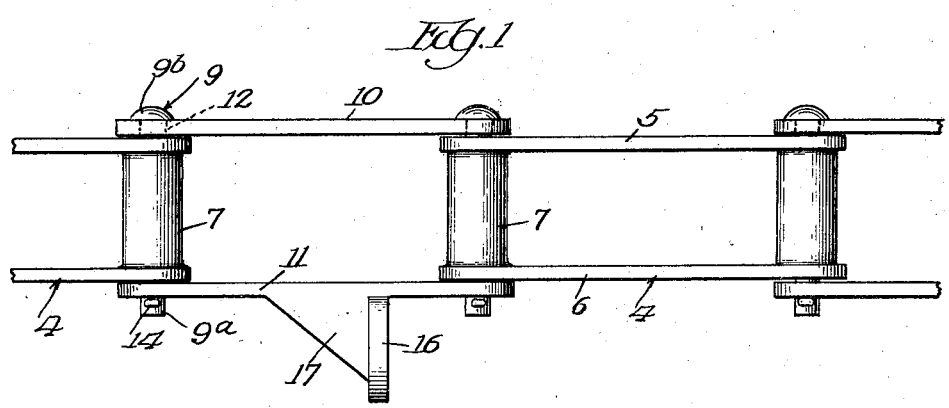
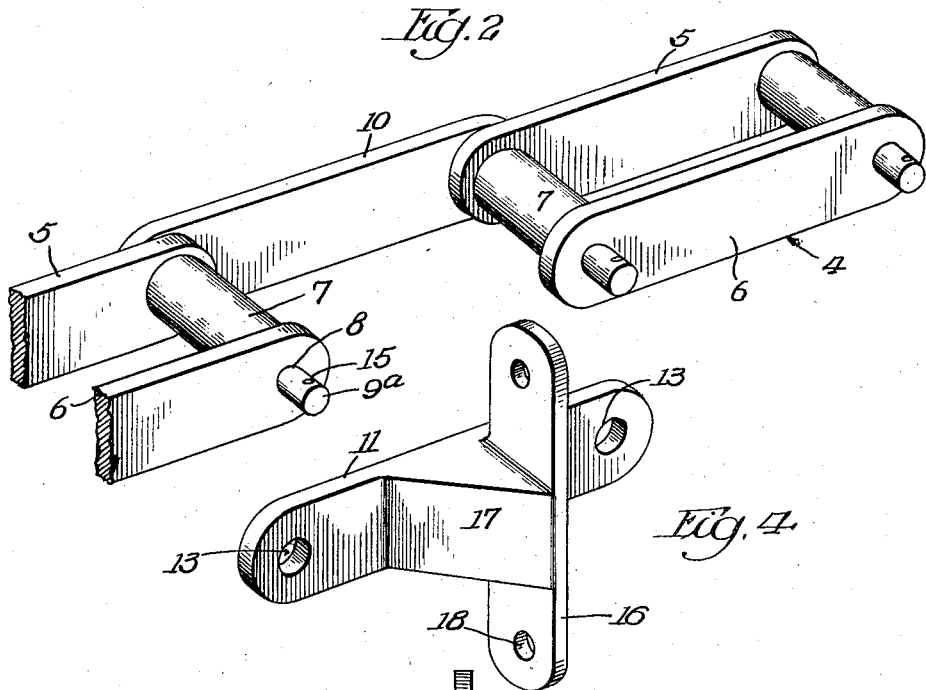
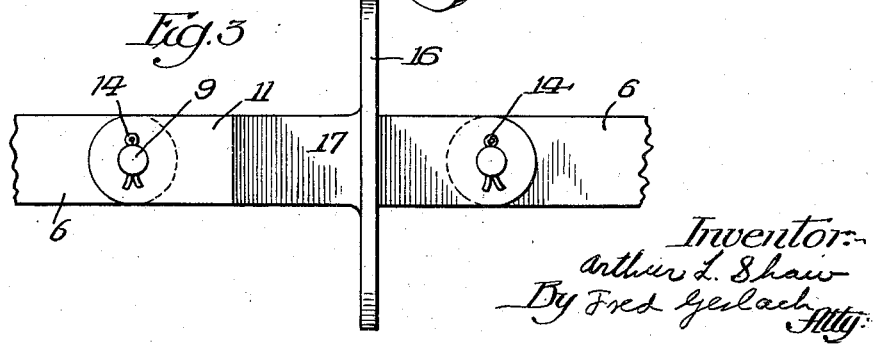
Inventor:
Arthur L. Shaw
By Fred Gerlach
Atty.

Patented June 24, 1930

1,765,945

UNITED STATES PATENT OFFICE

ARTHUR L. SHAW, OF CHICAGO, ILLINOIS, ASSIGNOR TO CHICAGO AUTOMATIC CONVEYOR CO., OF CICERO, ILLINOIS, A CORPORATION OF ILLINOIS

CONVEYER CHAIN

Application filed July 9, 1928. Serial No. 291,175.

The invention relates generally to conveyer chains for use in connection with coal conveyers and similar mechanisms. More particularly the invention relates to that type of chain which comprises a series of four-sided or rectangularly shaped members, pairs of links between the contiguous or opposed ends of the members and pivotally connected thereto by means of transversely extending pintles or pivot pins and drag lugs for engaging the material to be conveyed or for supporting drag bars.

In chains of this type, it has heretofore been proposed to make the elements for carrying the drag lugs in the form of supplemental links which are adapted to be positioned either against the outer faces of the links at one side of the chain or so that they are adjacent and in spaced relation with respect to the rectangularly shaped members and extend between and lap the contiguous ends of the links. These supplemental links are provided with apertures at the ends thereof whereby they are mounted upon and removably connected to the outwardly projecting and unheaded ends of the pintles or pivot pins. In practice the supplemental links are generally supplied independently of the chains and it is, therefore, incumbent upon the manufacturer of the conveyer mechanisms to attach these links in their proper and desired positions. This procedure necessitates the removal of the regular pivot pins which connect the rectangularly shaped members and the pairs of links and the substitution of longer pins of sufficient length to accommodate the supplemental links. Manifestly an operation of this character is costly because of the use of different and longer pins and inconveniences the manufacturer because the chain must be broken in several places during the removal of the regular pivot pins. Not only is the manufacturer inconvenienced in this manner but also the flexibility of the chain is materially impaired due to the use of the additional links. Furthermore, the weight of the chain is increased which requires the use of more operating or driving power.

The primary object of the present invention is to provide a conveyer chain in which some of the regular links which pivotally connect the rectangularly shaped members embody integral drag lugs. A characteristic and an advantage of forming the lugs in this manner is that all of the pivot pins are of standard or uniform length and consequently the lug carrying links may be interchanged readily with those links that do not carry lugs without breaking the chain. In addition the chain has the maximum amount of flexibility and embodies no excess weight.

Another object of the invention is to provide a conveyer chain for use in connection with coal and other such conveying mechanisms, in which the drag lug bearing links are reinforced and constructed so as to withstand in an effective manner heavy or maximum loads.

A further object of the invention is to provide a conveyer chain of the drag lug type, which is of new and improved construction and in which the elements are readily removable for repair or replacement purposes.

A still further object of the invention is the provision of a conveyer chain of the character under consideration, which may be manufactured at a comparatively low cost.

Other objects and advantages will be apparent from a consideration of the following detailed description.

The invention consists in the several novel features hereinafter set forth and more particularly defined by the claim at the conclusion hereof.

In the drawing which accompanies and forms a part of this specification or disclosure and in which like numerals and characters of reference denote corresponding parts throughout the several views:

Figure 1 is a fragmentary plan view of a conveyer chain embodying the invention;

Figure 2 is a perspective view;

Figure 3 is a side elevational view of the parts shown in Figure 1; and

Figure 4 is a perspective of one of the drag lug carrying links.

The invention is exemplified in a chain which is adapted for use in a coal conveyer or like apparatus and embodies drag lugs for engagement with the material to be conveyed or for supporting drag bars in their operative position across the material supporting pan or tray of the conveyer. This chain is of the endless variety and comprises a series of four-sided or rectangularly shaped members 4, each of which consists of a pair of parallel and coextensive side plates 5 and 6 and a pair of cylindrically shaped end elements 7 which extend between and serve to hold the side plates in spaced relation as shown in Figure 1. The side plates and end elements are formed integrally with each other so that the members 4 will be of a unitary character. A transversely extending cylindrical hole 8 is formed in each of the end elements 7 and the adjoining or connected ends of the plates 5 and 6 and this hole is adapted to receive a printle or head bearing pin 9. A pair of links 10 and 11 extend between and pivotally connect the opposed or adjoining ends of each pair of members 4. These links are parallel and coextensive with each other and are held in spaced relation upon the pins 9 as described hereafter. The links 10 which are positioned at one side of the chain have transversely extending circular holes or apertures 12 punched in the ends thereof for receiving the shank portions $9^a$ of the pins 9. The heads $9^b$ of said pins abut against the outer faces of the links 10 so as to prevent lateral displacement of the links and hold the latter against the contiguous faces of the side plates 5. The links 11 which are positioned at the other side of the chain, have circular holes or apertures 13 punched in the ends thereof. The unheaded ends of the pins 9 project outwardly a comparatively short distance beyond the side plates 6 and extend through these apertures 13 to hold the links 11 in their operative position. Said links 11 are held against the outer faces of said side plates 6 and against lateral displacement by the heads and legs of cotter pins 14 which extend through transverse openings 15 formed in the extreme outer ends of the pin-shanks $9^a$. These cotter pins may be withdrawn readily when it is desired to remove the links 11 for repair or replacement purposes. All of the pins 9 are of a standard or uniform length and the unheaded ends thereof terminate in close proximity to the outer faces of the links 11 so that they do engage or contact with the material to be conveyed.

Some of the links 11 are provided with drag lugs 16 for engaging the material to be conveyed or for use as a drag bar support. Each of the lugs 16 is in the form of an elongated plate which extends at right angles and is integrally formed with the outer face of the link which it is associated. The ends of this plate are rounded and project a considerable distance above and below the chain as indicated in Figure 3 of the drawing. The front face of each drag lug 16 is flat and extends at right angles to the link 11. The rear face is provided with a triangularly shaped reenforcing web 17. This web extends the full width of the link 11 and is integrally formed with said link and the lug 16. A characteristic and an advantage of reenforcing the drag lug by a web of this type is that the lug is capable of withstanding great load strains, due to the fact that the reenforcement is distributed over a substantially large area thereof. Holes or apertures 18 are punched in the rounded ends of the drag lug so that a drag bar may be secured to the lug by means of bolts or similar attaching devices. A feature and advantage of forming the drug lug integral with one of the regular pivot links 11 is that the chain embodies the maximum amount of flexibility and there is no excess or added metal. Furthermore it standardizes the parts of the chain inasmuch as the pins 9 are all of uniform length or size. In the event that it should be necessary to replace or rearrange any of the links bearing drag lugs it is only necessary to remove the cotter pins 14. This latter operation may be effected easily and does not result in the chain being broken.

The chain disclosed herein is extremely simple in construction and operates to carry a maximum load in proportion to the amount or weight of the metal used therein. Furthermore, provision is made for readily replacing or removing the drag lug bearing links without breaking the chain.

The invention is not to be understood as restricted to the details set forth, since these may be modified within the scope of the appended claim, without departing from the spirit and scope of the invention.

Having thus described the invention, what I claim as new and desire to secure by Letters Patent, is:

A conveyer chain comprising in combination, a plurality of one piece and four-sided chain-members having transverse pivot pins of uniform length extending through the end elements thereof, pairs of parallel links extending between and positioned outwardly of said members, the links at one side of the chain having openings through which the pins extend and being held in place by heads on said pins, the links at the other side of the chain fitting against and contacting with the chain-members and having openings through which the pins extend, some of the last mentioned links being provided with integral outwardly projecting drag lugs on the outer faces thereof, said lugs projecting above and below the side edges of the links that are associated therewith and having flat faces extending transversely and at substantially right angles to said asociated links whereby drag bars may be operatively connected to the chain and cotter pins extending through the unheaded ends of said pins, operable to hold said second mentioned links in place.

Signed at Chicago, Illinois, this 22d day of June, 1928.

ARTHUR L. SHAW.